(12) United States Patent
Ormachea et al.

(10) Patent No.: US 8,484,821 B2
(45) Date of Patent: Jul. 16, 2013

(54) DEVICE FOR SECURING TRIM TO A SEAT

(75) Inventors: Raymond Ormachea, Fraser, MI (US); Robert Bailey, Waterford, MI (US)

(73) Assignee: Automated Solutions, Shelby Township, MI (US)

( * ) Notice: Subject to any disclaimer, the term of this patent is extended or adjusted under 35 U.S.C. 154(b) by 0 days.

(21) Appl. No.: 13/537,571

(22) Filed: Jun. 29, 2012

(65) Prior Publication Data
US 2012/0260480 A1 Oct. 18, 2012

Related U.S. Application Data

(63) Continuation of application No. 11/471,968, filed on Jun. 21, 2006, now Pat. No. 8,245,377.

(60) Provisional application No. 60/692,934, filed on Jun. 22, 2005.

(51) Int. Cl.
*B23Q 7/04* (2006.01)
*B68G 7/05* (2006.01)
*B68G 7/12* (2006.01)

(52) U.S. Cl.
USPC ............... 29/283; 29/91; 29/91.1; 269/37

(58) Field of Classification Search
USPC ............. 29/91, 91.1, 91.5, 283; 269/40, 48.2, 269/48.3, 54.2, 90; 600/214; 81/321, 345, 81/3.8; 606/51
See application file for complete search history.

(56) References Cited

U.S. PATENT DOCUMENTS

| | | | |
|---|---|---|---|
| 1,456,943 A | 5/1923 | Smith | |
| 1,851,126 A | 3/1932 | Mikkelsen | |
| 1,907,436 A | 5/1933 | Niemi | |
| 2,320,611 A | 6/1943 | Kandle | |
| 2,320,967 A | 6/1943 | Dunkelberger | |
| 2,544,142 A | 3/1951 | Dritley | |
| 2,553,479 A | 5/1951 | Schmarje et al. | |
| 2,792,253 A | 5/1957 | Bliss | |
| 3,135,340 A | 6/1964 | Robinsky | |
| 3,981,673 A | 9/1976 | Sokolow | |
| 5,134,763 A | 8/1992 | Schulz et al. | |
| 5,622,398 A | 4/1997 | Duchaine, Jr. | |
| 5,642,913 A | 7/1997 | Brown | |
| 5,755,436 A | 5/1998 | Reist | |
| 5,826,928 A | 10/1998 | Shang | |
| 6,059,336 A | 5/2000 | Meronek | |
| 6,145,904 A | 11/2000 | Bellandi et al. | |
| 6,290,227 B1 | 9/2001 | Reist | |
| 6,298,532 B1 | 10/2001 | Walt, II | |
| 6,435,583 B1 | 8/2002 | Reist | |
| 6,629,346 B2 | 10/2003 | Tillner | |
| 7,430,793 B2 | 10/2008 | Hamilton et al. | |
| 7,472,465 B2 | 1/2009 | Nagele | |
| 7,740,639 B2 | 6/2010 | Hummel et al. | |

(Continued)

*Primary Examiner* — Lee D Wilson
*Assistant Examiner* — Jamal Daniel
(74) *Attorney, Agent, or Firm* — Carlson, Gaskey & Olds, P.C.

(57) ABSTRACT

A seat assembly machine includes a plurality of grippers useful for securing a piece of trim to a seat cushion. In a disclosed example, each gripper includes a plurality of prongs that are moved between neutral, closed and released positions that each facilitate a different portion of the assembly process. In one example, each gripper includes a sleeve within which the prongs are moveable so that the prongs are manipulated between the neutral, closed and released positions. A disclosed example sleeve includes an interior channel having a contour that manipulates the prongs between the different positions based on the location of the prongs within the sleeve.

19 Claims, 9 Drawing Sheets

U.S. PATENT DOCUMENTS

| | | |
|---|---|---|
| 8,104,806 B1 | 1/2012 | Shih |
| 2002/0108222 A1 | 8/2002 | Tillner |
| 2002/0177861 A1 | 11/2002 | Sugiyama et al. |
| 2005/0251981 A1 | 11/2005 | Mossbeck et al. |
| 2007/0028435 A1 | 2/2007 | Ormachea et al. |
| 2008/0315605 A1 | 12/2008 | Shih |
| 2009/0007407 A1 | 1/2009 | Hamilton et al. |
| 2009/0275959 A1 | 11/2009 | Cui et al. |
| 2009/0299384 A1 | 12/2009 | Iida et al. |
| 2009/0318937 A1 | 12/2009 | Matsuoka et al. |
| 2009/0326558 A1 | 12/2009 | Cui et al. |
| 2010/0036396 A1 | 2/2010 | Iida et al. |
| 2010/0049217 A1 | 2/2010 | Matsuoka et al. |

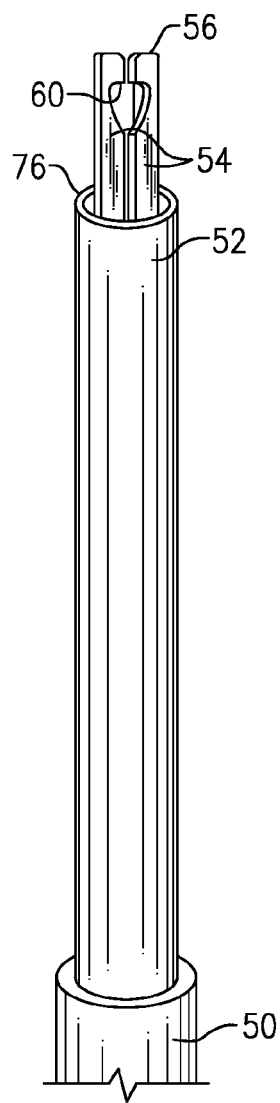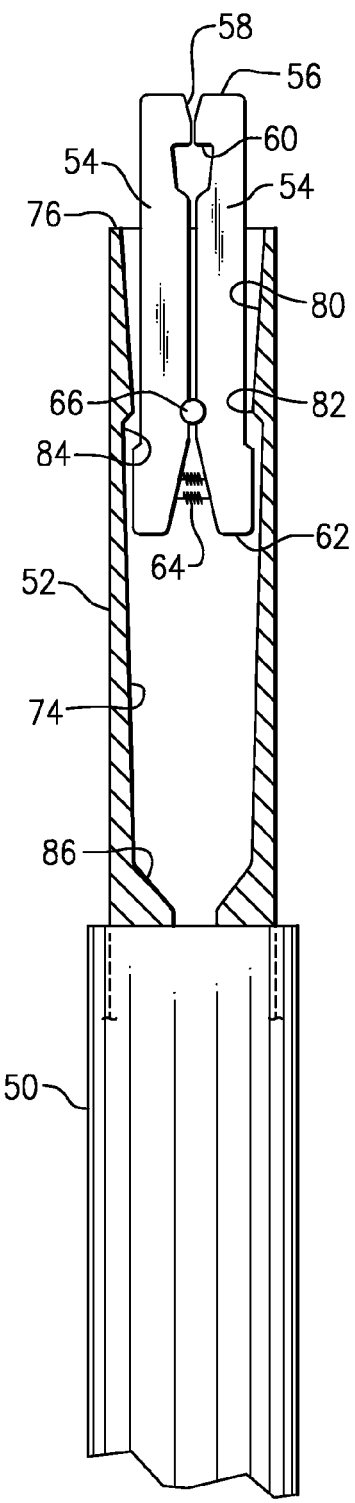
FIG.6A
FIG.6B

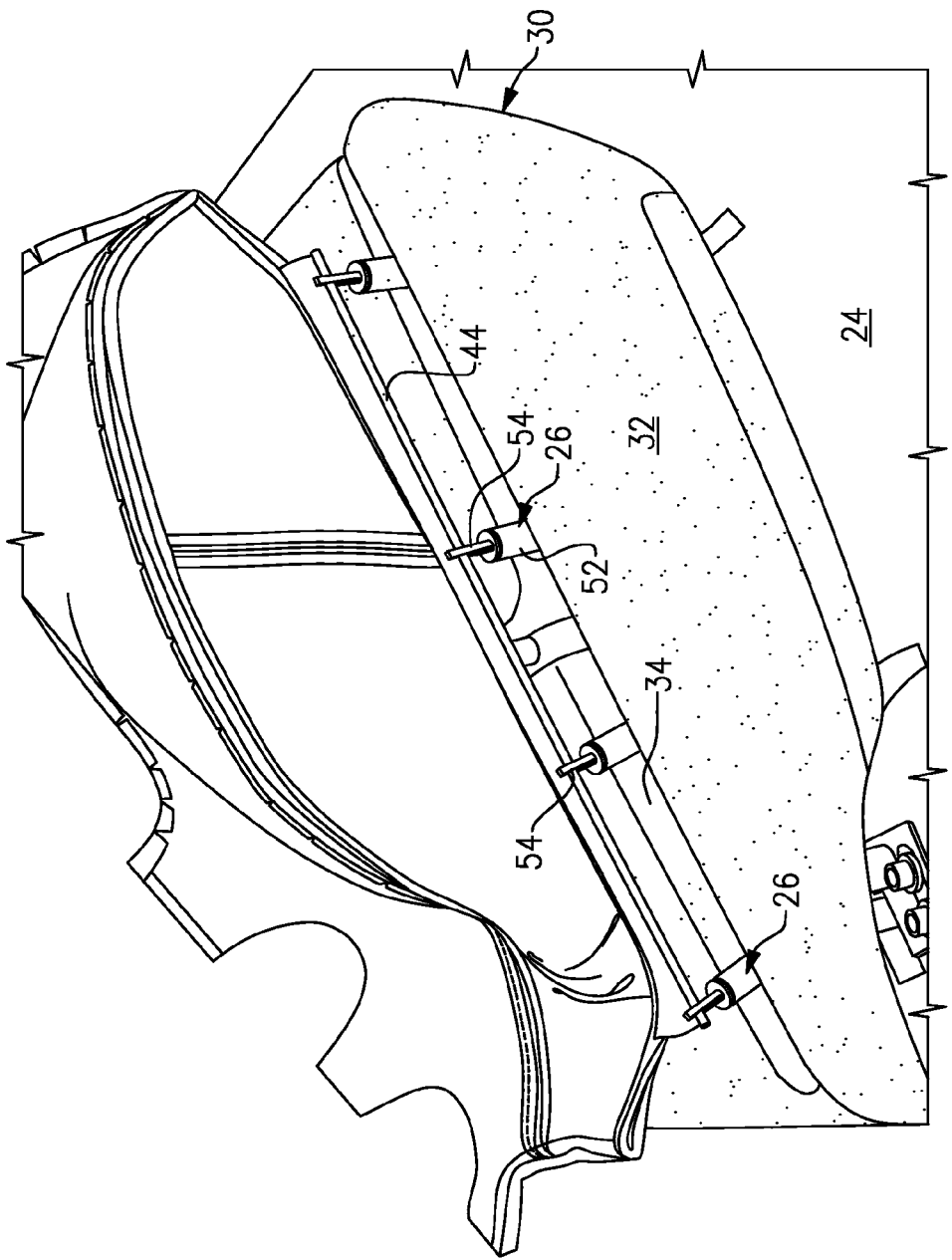

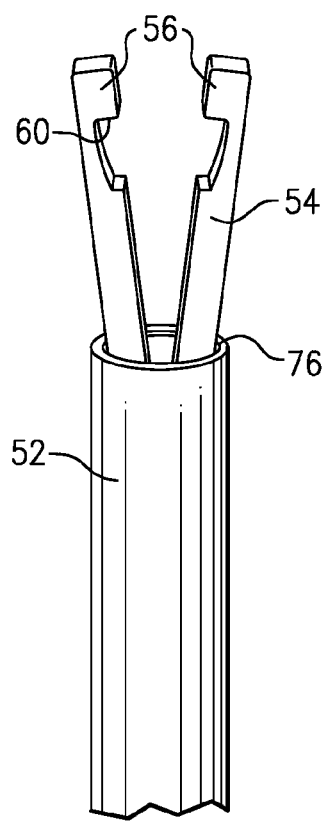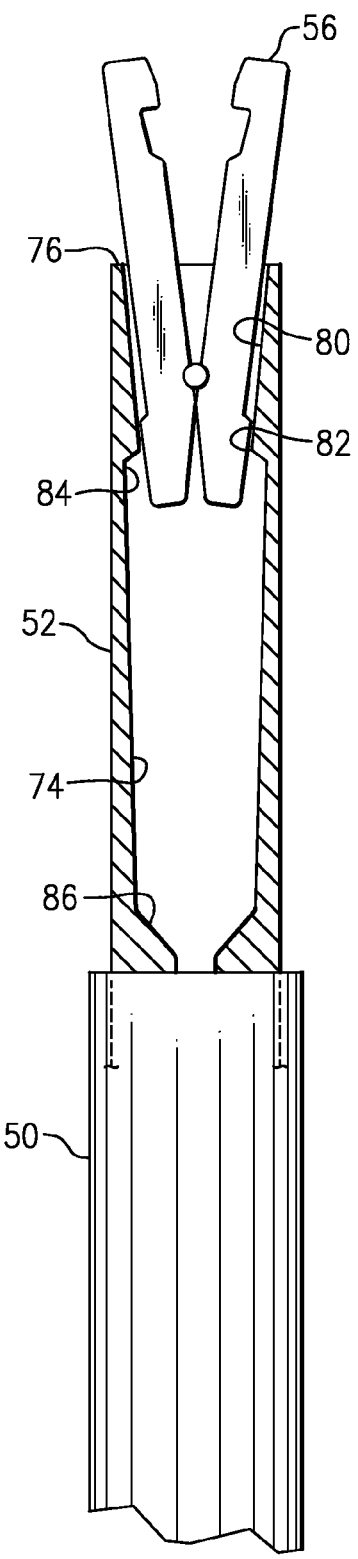
FIG.10A
FIG.10B

DEVICE FOR SECURING TRIM TO A SEAT

CROSS REFERENCE TO RELATED APPLICATIONS

This application is a continuation of U.S. application Ser. No. 11/471,968 filed Jun. 21, 2006, now U.S. Pat. No. 8,245,377, which claims priority to U.S. Provisional Application No. 60/692,934 filed Jun. 22, 2005.

BACKGROUND OF THE INVENTION

Seat manufacturing techniques are known for making seats such as those used in automotive vehicles. Typical seats include a cushion having a contour that establishes a shape of the seat. The cushion is supported on a seat frame. A covering such as fabric or leather covers over the foam. The covering is typically referred to as the seat trim. The manner in which a trim cover conforms to the intended shape of the seat, which is typically dictated by the shape of the foam cushion and the supporting seat structure, is commonly referred to as the seat definition. The better that the trim conforms to the foam cushion and the intended seat contour, the better the definition.

There are various known techniques for securing trim onto a seat. One technique includes providing hog rings on the foam and securing the trim to the hog rings using a tying technique. This approach is relatively labor intensive and time consuming Additionally, there are inconsistencies and inaccuracies with this approach because it is very operator dependent. Seat manufacturers require reduced costs and desire uniform quality of seats. The hog ring-tying approach often does not meet current demands.

Another approach includes gluing trim to the seat foam. While this technique is generally reliable for providing good seat definition and more automated than the hog ring-tying approach, there are drawbacks. The adhesive used during the gluing process typically is heated to cure it for securing the trim to the foam. During the heating and curing process, the adhesive hardens. This at least partially reduces the softness associated with the foam of the seat cushion. The hardened foam diminishes seat occupant comfort levels.

Those skilled in the art are always striving to make improvements. There is a need for an improved, automated solution for securing trim onto the seat. This invention addresses that need.

SUMMARY OF THE INVENTION

An example seat assembly machine includes a gripper that has a plurality of prongs retractably moveable relative to a sleeve for gripping a piece of seat trim. A control is associated with the gripper for manipulating the prongs between a neutral position where the prongs are biased toward each other and allowed to move relative to each other if the bias is overcome, a closed position where the prongs are prevented from movement relative to each other by the sleeve and a released position where the prongs are separated from each other.

In one example, the sleeve includes a channel within which the prongs move as they are manipulated between the neutral, closed and released positions. The contour of the channel in one example controls the position of the prongs based upon the orientation of the prongs relative to the channel.

One example channel has a varying width along at least a portion of the channel near one end of the sleeve. The width is wide at the end of the sleeve, narrower at at least one point within the sleeve and then wide again further inward into the sleeve. The portion of the channel having the narrower width is operative to secure the prongs in the closed position and to move the prongs into the released position as the prongs are manipulated within the sleeve.

An example method of securing trim to a seat cushion includes positioning the seat cushion relative to a plurality of grippers. Each of the grippers has a plurality of prongs in a neutral position. An appropriate portion of the trim is received by the prongs while they are in the neutral position. The prongs are then moved into a closed position where they maintain a firm grip on the trim. The grippers and the trim are then manipulated relative to the seat foam to secure at least a portion of the trim into clips that are fixed to the foam. The prongs of the grippers are then moved into a released position so that the trim, which is now connected with the seat foam, can be handled as desired.

A machine and process designed according to this invention facilitates automatically securing seat trim to a seat cushion that results in a well-defined seat appearance and provides consistently reliable results.

The various features and advantages of this invention will become apparent to those skilled in the art from the following detailed description. The drawings that accompany the detailed description can be briefly described as follows.

BRIEF DESCRIPTION OF THE DRAWINGS

FIGS. 6A and 6B show the example gripper assembly in a neutral position.

FIG. 7 diagrammatically illustrates the example gripper assemblies in the neutral position of FIGS. 6A and 6B and receiving a portion of the example trim.

FIGS. 10A and 10B show the example gripper assembly in a released position that facilitates retrieving the seat cushion and trim after the operation of the gripper assemblies is complete.

DETAILED DESCRIPTION

This invention provides an automated solution to the process of securing trim to a seat cushion in an efficient and reliable manner which provides improved definition and comfort compared to prior techniques. A disclosed example arrangement and process facilitates securing trim to a seat cushion as part of an overall seat assembly process.

Figure 1:
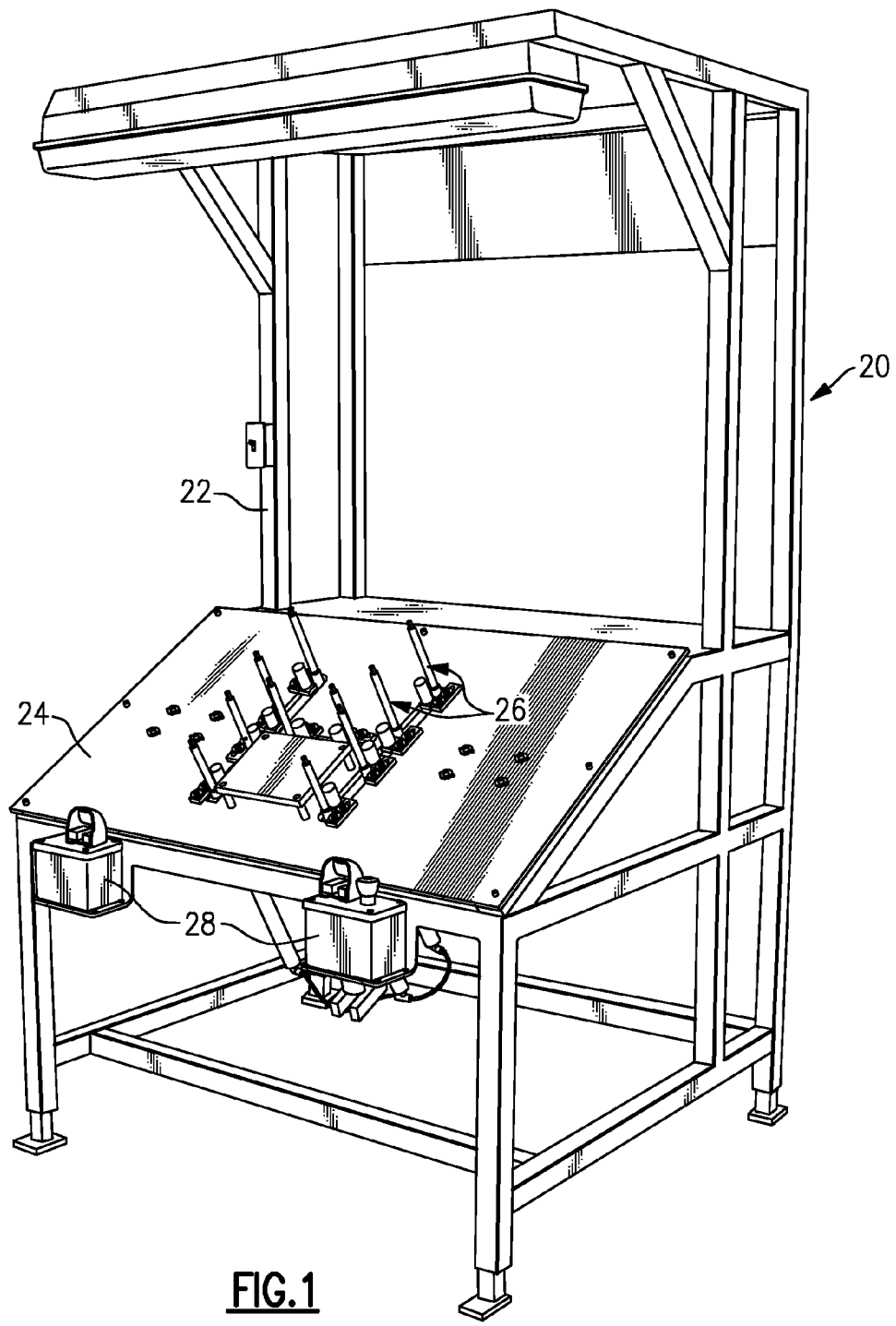
FIG. 1 is a perspective, diagrammatic illustration of an example machine designed according to an embodiment of this invention.

FIG. 1 diagrammatically illustrates an example machine 20 that is useful for securing trim to a seat cushion. The example machine 20 includes a frame 22 and a work surface 24. A plurality of grippers 26 are arranged on the work surface 24 in a configuration that corresponds to a predetermined pattern based upon a particular seat style, for example. A control 28 is associated with the grippers 26 and allows an operator to control operation of the grippers 26 to facilitate an at least partially automated process for securing trim on a seat cushion.

Figure 2:
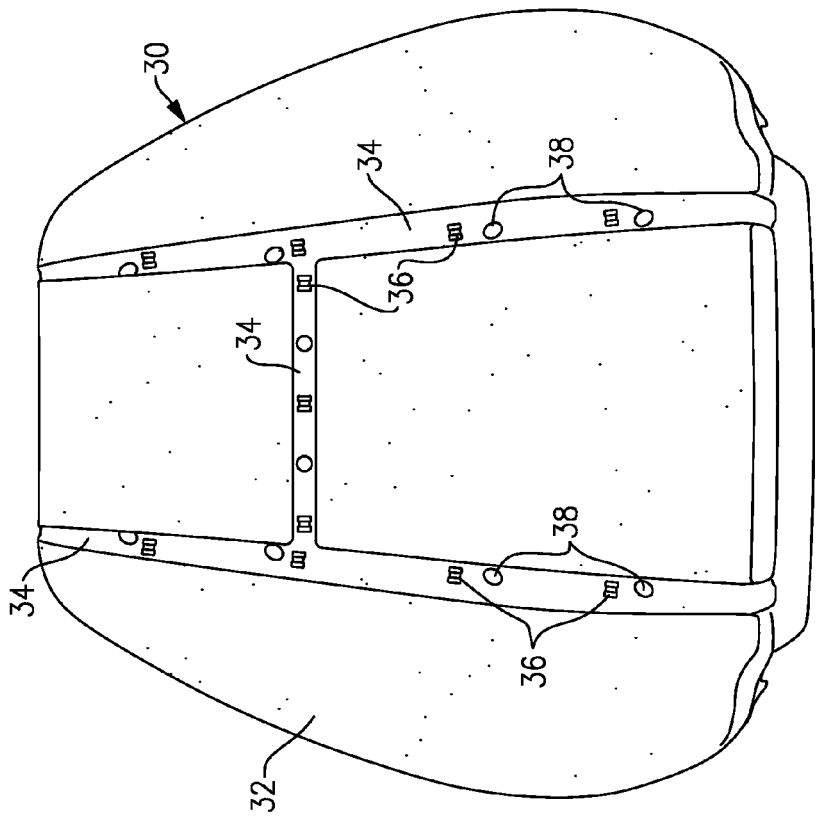
FIG. 2 is a perspective, diagrammatic illustration of an example seat cushion.

FIG. 2 diagrammatically shows an example seat cushion 30. This example may be used as part of a seat back, for example. A body 32 of the example seat cushion 30 comprises a known foam material. Trenches 34 are formed in the body 32 in a generally H-shaped pattern. The contours of the body 32 and the trenches 34 facilitate establishing the finished look or contour of the eventual seat.

In the illustrated example, the trenches 34 include a plurality of clips 36. In one example, during the molding process, the clips 36 are held in place so that they are secured to the foam of the body 32. There are known techniques for accomplishing this.

Figure 3:
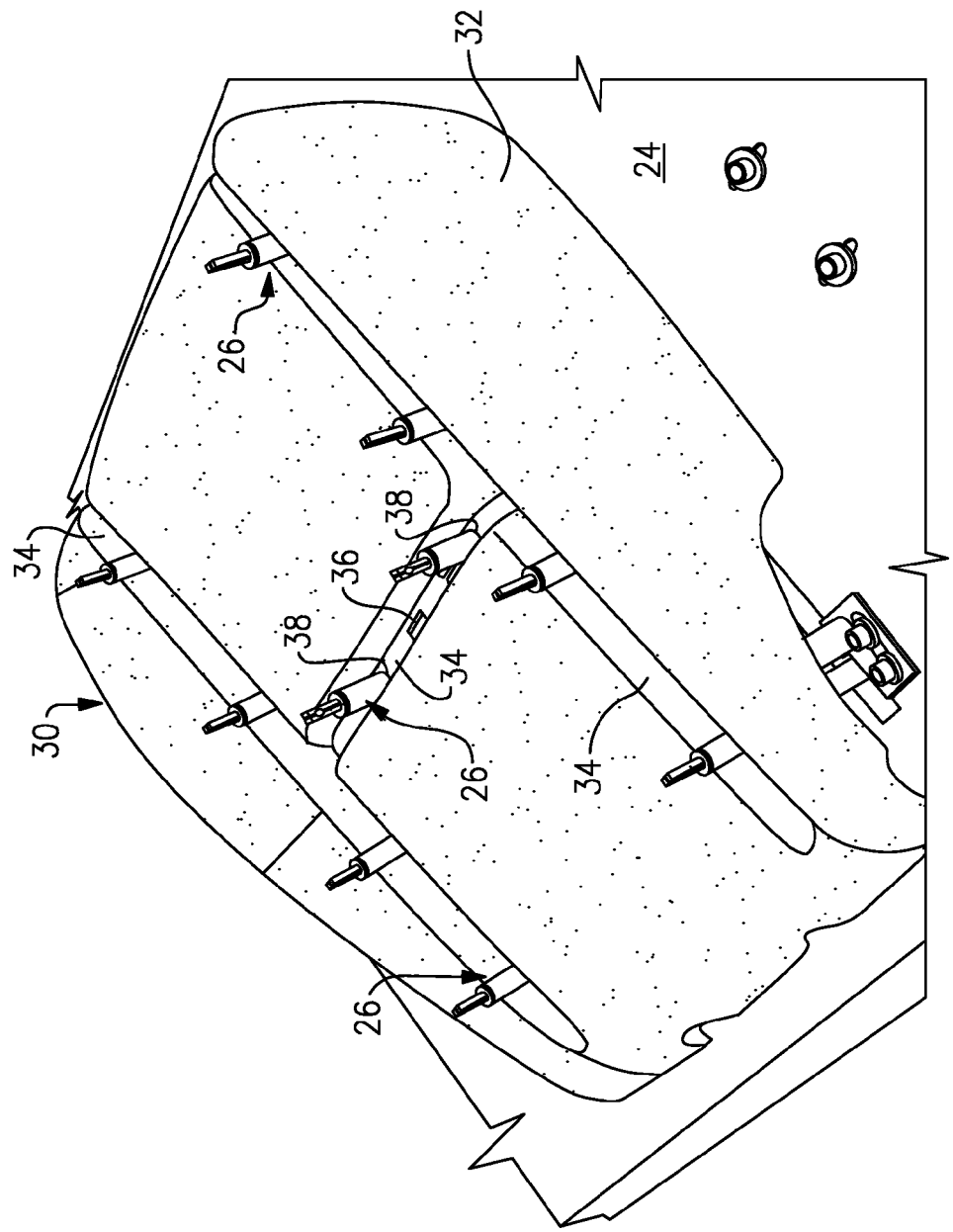
FIG. 3 diagrammatically illustrates the example seat cushion of FIG. 2 supported on the example machine of FIG. 1.

The example trenches 34 also include openings 38 which comprise generally circular holes extending through the cushion 30. In this example, the openings 38 are positioned relative to each other corresponding to the position of the grippers 26 relative to each other such that the cushion 30 can be received onto the work surface 24 as shown in FIG. 3, for example. In this example, one gripper 26 extends through each hole 38. In this position, the grippers 26 are ready for gripping at least a portion of trim that will be applied to the cushion 30.

Figure 4:
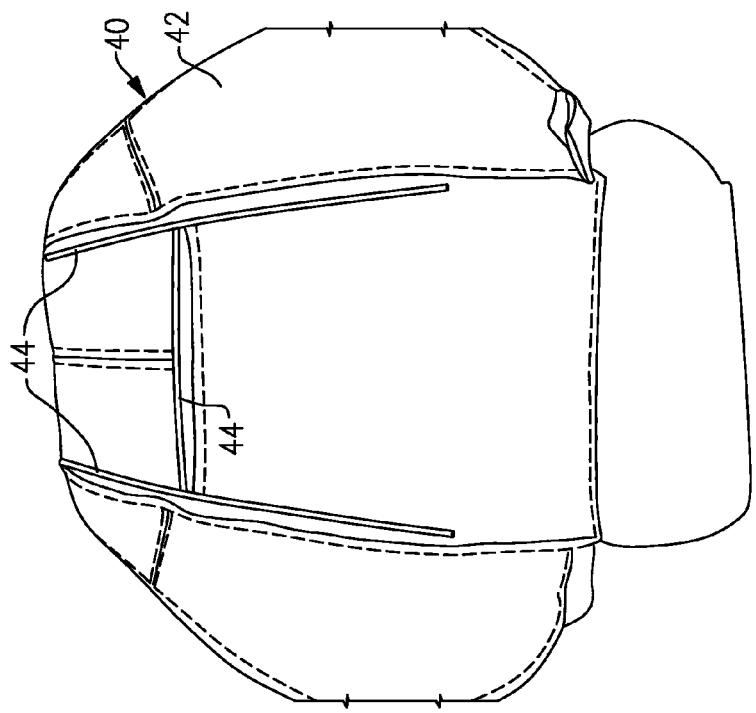
FIG. 4 schematically illustrates an example piece of seat trim useful with the seat cushion of FIG. 2.

FIG. 4 shows an example piece of trim 40. An underside 42 of the trim piece 40 is shown in the illustration. An outer side or finished side is facing downward according to the drawing and is not visible in the illustration. The piece of trim 40 may be fabric or leather, for example.

One feature of the example piece of trim includes flaps 44 that extend away from the underside 42. The flaps 44 have a generally H-shaped pattern that corresponds to the arrangement of the trenches 34 on the cushion 30. In one example, an outermost edge of the flaps 44 has a plastic edging that provides an at least somewhat rigid and stable surface that is received by the clips 36 when the trim piece 40 is applied to the foam cushion 30. In one example, the plastic edging also provides a surface or feature that the grippers 26 are able to hold onto during an assembly process.

The grippers 26 facilitate an assembly process, in part, by manipulating the trim flaps 44 relative to the foam cushion 30 and more specifically the clips 36 for inserting at least a portion of the flaps 44 (e.g., a plastic edging) into the clips 36 to secure the trim piece 40 to the foam cushion 30. This technique is believed to provide improved seat definition without compromising the softness of the foam of the pad 30. In this example, the reception of at least the plastic edging on the trim flaps 44 within the clips 36 that are fixed in the trenches 34 provides good definition and a reliable and secure placement of the trim piece 40 onto the foam cushion 30.

Figure 5:
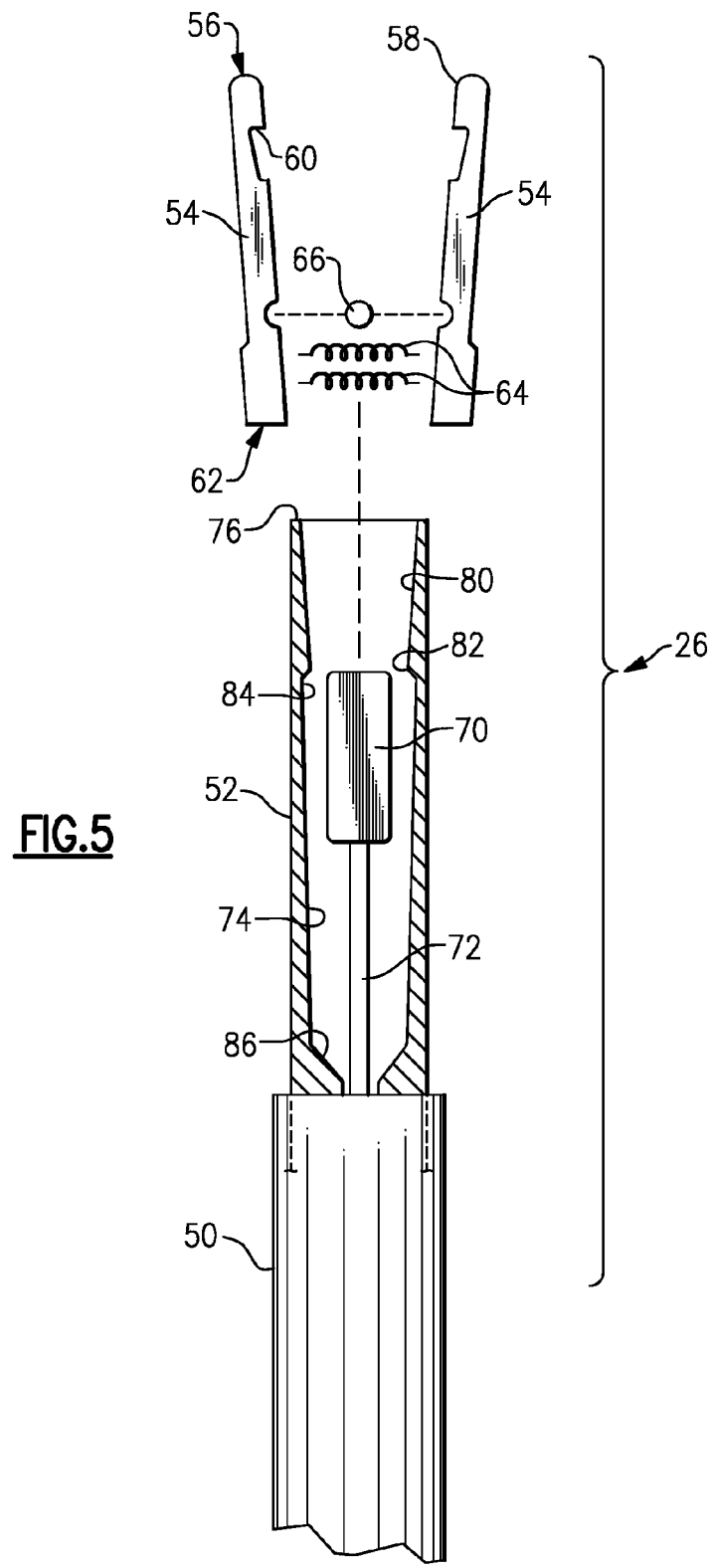
FIG. 5 is a partially exploded, partially cross-sectioned view of an example gripper assembly.

An example gripper 26 is shown in FIG. 5 partially in cross-section and in a partially exploded view. Each of the grippers of the machine 20 in one example are identical. The example gripper of FIG. 5 includes a cylinder 50 and a sleeve 52. In this example, the sleeve 52 is telescopically, at least partially received in the cylinder 50. In one example, the cylinder 50 is in a fixed position relative to the work surface 24. The sleeve 52 can be extended further from or retracted further into the cylinder 50 to alter the height of the gripper 26 relative to the work surface 24. Movement of the sleeve 52 also facilitates an assembly process as will be described. The movement of the sleeve 52 in one example is accomplished using a pneumatic actuator that is controlled by appropriate manipulation of the control 28 (e.g., moving a handle or pressing a button).

A plurality of prongs 54 are received at least partially within the sleeve 52. In this example, two prongs 54 are identical to each other. One end 56 of the prongs 54 remains outside of the sleeve 52 throughout an entire assembly process in one example. Angled or chamfered edges 58 are included near the end 56 to facilitate inserting a trim flap 44 or at least plastic edging on such a flap between the prongs 54 such that the trim flap is retained between the prongs 54. The illustrated example includes recesses 60 on each of the prongs that provide a gripping surface for holding onto a corresponding portion of a trim flap received between the prongs 54.

An opposite end 62 of the prongs 54 remains within the sleeve 52 during one example assembly process. The ends 62 are biased apart by a biasing member 64. In this example, the biasing member 64 comprises two coil springs. A pivot member 66 is positioned between the prongs 54 such that biasing apart the ends 62 biases the ends 56 toward each other.

The illustrated example includes a carriage 70 and a rod 72 fixed to the carriage 70. The prongs 54 and the pivot member 66 are associated with the carriage 70 such that movement of the rod 72 relative to the sleeve 52 causes corresponding movement of the prongs 54 and the carriage 70 within the sleeve 52. In this example, a pneumatic actuator controls the position of the carriage 70 and, therefore, the prongs 54 within the sleeve 52. By manipulating the rod 72 and the carriage 70, the position of the prongs 54 within the sleeve 52 can be altered to move the prongs between a neutral position where the ends 56 are biased toward each other but able to be separated if the bias is overcome, a closed position where the ends 56 of the prongs 54 cannot move apart from each other, and a released position where the ends 56 are separated from each other.

The example sleeve 52 includes an interior channel 74 that has a contour that facilitates manipulating the prongs 54 between the neutral, closed and released positions. In this example, the channel 74 has an interior dimension corresponding to a width of the channel, for example. The channel 74 is open at an end 76 of the sleeve 52 to facilitate the prongs 54 moving in a retractable manner relative to the sleeve 52 and protruding out of the sleeve 52 a desired distance, depending on the stage of an assembly process. The example contour includes a tapering portion 80 that provides a wide dimension near the end 76. One end of the tapering portion 80 establishes a smaller inside dimension at a transition 82 in the channel 74. Further inward into the sleeve 52 another portion 84 has a larger dimension as can be appreciated from FIG. 5. The position of the prongs 54 relative to the transition 82 and the tapering portion 80 in this example controls which of the three operative positions the prongs are in.

FIGS. 6A and 6B show the example gripper 26 with the prongs 54 in a neutral position. The end 56 of the prongs 54 is spaced from the end 76 of the sleeve 52 a first distance. As best appreciated from FIG. 6B, the prongs 54 are within the channel 74 such that there is some clearance between outward lateral edges of the prongs 54 and the tapering portion 80 of the channel 74. The biasing member 64 biases the ends 62 away from each other and biases the ends 56 of the prongs 54 toward each other. Because of the clearance between the prongs 54 and the tapering portion 80, the ends 56 of the prongs 54 can be separated if the bias of the biasing member 64 is overcome. This can be accomplished, for example, by an operator using his finger to pry apart the ends 56 of the prongs 54. This can also be accomplished by inserting an edge of the trim flap 44 between the prongs 54. The illustrated example includes the ramped or chamfered surface 58 to facilitate inserting at least an edge of the trim flap 44 between the prongs 54, even in the presence of the bias of the biasing member 64. Keeping the ends 56 biased toward each other facilitates more easily placing the trim flap 44 within the grip of the grippers 26.

FIG. 7 diagrammatically illustrates a plurality of the grippers 26 holding a received edge of a trim flap 44 while the grippers 26 are in the neutral position shown in FIGS. 6A and 6B. This is accomplished in one example by an operator manually inserting at least the edge of the trim flap 44 between the prongs 54 of each gripper 26. Once this is accomplished for all grippers and all trim flaps of a particular seat arrangement, the machine 20 can be used for securing the trim flaps 44 to the clips 36 on the seat cushion 30.

Figure 8A:
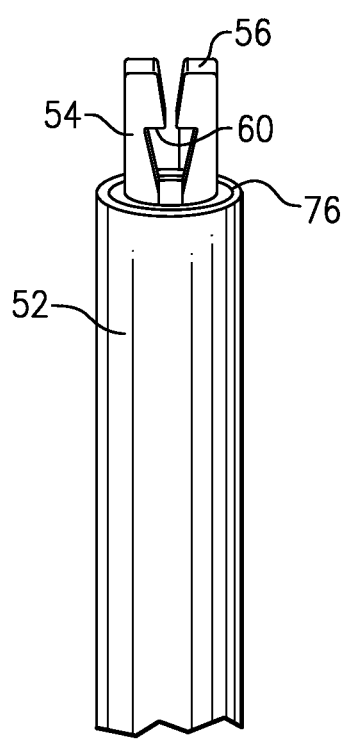
FIG. 8A and 8B show the example gripper assembly in a closed position.
Figure 8B:
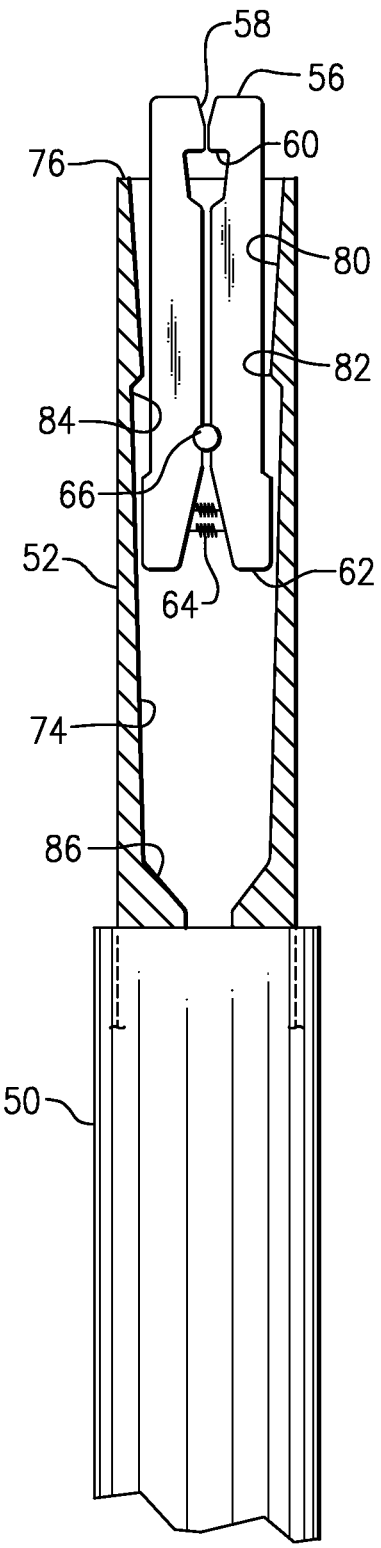

To facilitate this, the grippers 26 are controlled so that the prongs 54 move into a closed position where the ends 56 are secured against moving apart, which securely retains the trim flap 44 in the grippers 26. FIGS. 8A and 8B show a gripper 26 with the prongs 54 in the closed position. In this position, the end 56 of each prong 54 is spaced from the end 76 of the sleeve 52 a second distance that is smaller than the first distance associated with the neutral position shown in FIG. 6A, for example.

As can be appreciated from FIG. 8B, the pivot member 66 is retracted further into the sleeve than the transition 82 of the channel 74. In this position, the prongs 54 cannot move away from each other so that the ends 56 are secured in the closed position, which prevents the trim flap 44 from being inadvertently removed from a gripper during an assembly process. In the position of FIG. 8B, the outward lateral edges of the prongs 54 are received directly against the channel 74 at the transition 82. This prevents outward movement of the ends 56 relative to each other. The prongs 54 are moved into this example position by appropriate movement of the carriage 70 and the rod 72 (which are not shown in FIG. 8B for clarity but are shown in FIG. 5).

Figure 9:
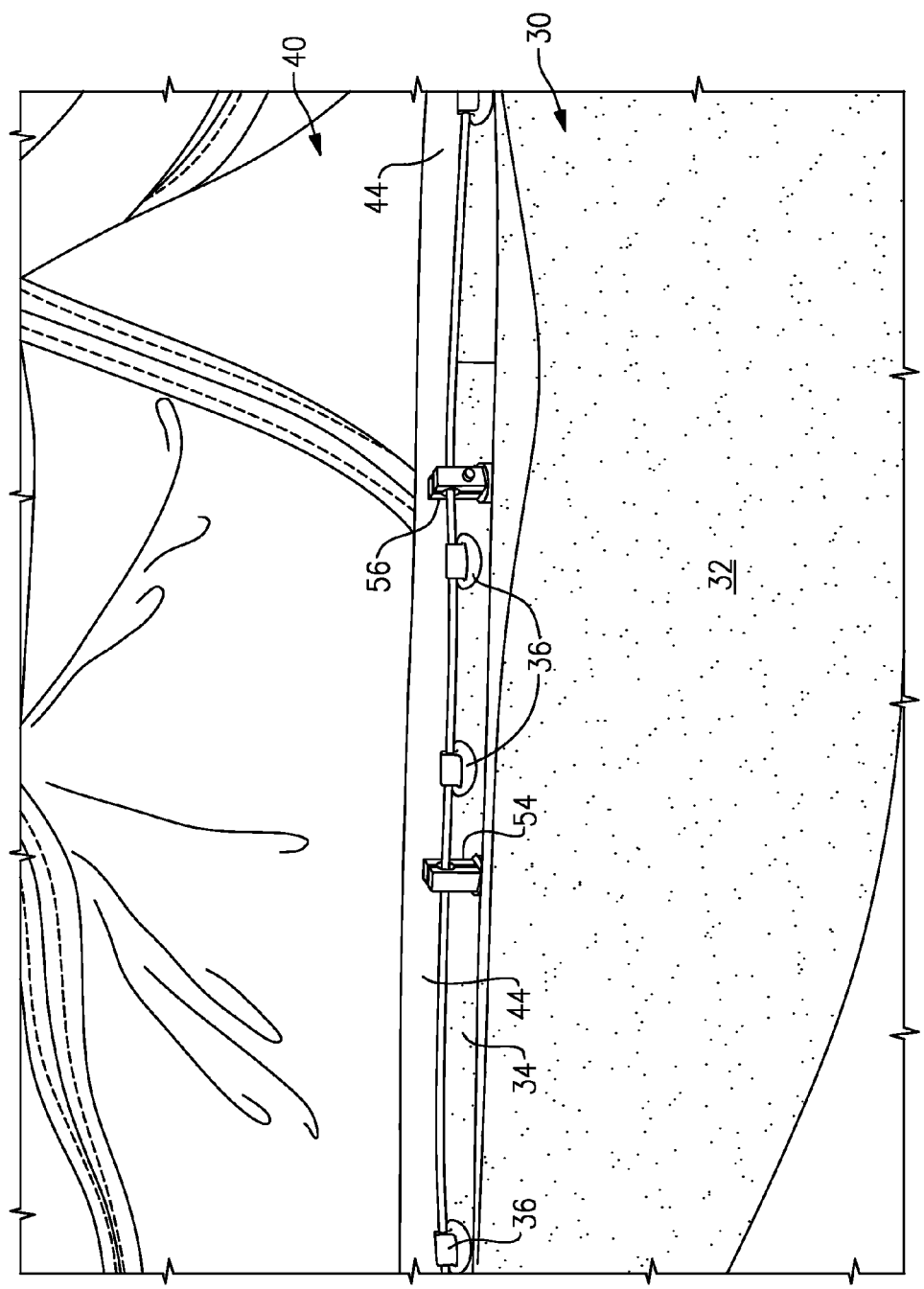
FIG. 9 diagrammatically shows the example grippers in the example closed position of FIGS. 8A and 8B holding the example piece of trim in a position during an assembly process.

Once the prongs 54 are in the closed position, the sleeve 52 can be retracted relative to the cylinder 50 so that the edge of the trim flap 44 is brought closer to and eventually inserted at least partially into the clips 36. This movement of the sleeve 52 relative to the cylinder 50 in the illustrated example corresponds to the sleeve 52 moving downward and inward further into the cylinder 50. This movement corresponds to moving the sleeve 52 from the position shown in FIG. 7 to the position shown in FIG. 9, for example. As can be appreciated from FIG. 9, an edge on the trim flap 44 has now been secured within the clips 36 as a result of the movement of the grippers 26. At this point, the grippers 26 can be released and the cushion 30 and trim 40 can be retrieved (e.g., removed from the work surface 24) for further manipulation of the trim 40 onto the cushion 30 and completion of a seat assembly process. The illustrated example grippers 26 facilitate the retrieval of the trim 40 and cushion 30 by an automatic manipulation of the prongs 54 into a released position.

FIGS. 10A and 10B show the example prongs 54 in a released position. In this position, the ends 56 of the prongs 54 are spaced from the end 76 of the sleeve 52 a third distance that is greater than the first distance associated with the neutral position (shown in FIG. 6A for example). In the released position, the ends 56 of the prongs 54 are separated from each other.

As can be appreciated from FIG. 10B, by moving the rod 72, carriage 70 and prongs 54 further outward in the channel 74, the ends 62 eventually approach the transition 82. The reduced interior dimension of the channel 74 at the transition 82 effectively pushes the ends 62 toward each other against the bias of the biasing member 64. At the same time, because of the presence of the pivot member 66, the ends 56 are separated from each other. The contour and dimension of the tapered portion 80 controls the amount of separation of the ends 56 of the prongs 54.

After the assembled cushion and trim piece 40 are removed from the work surface 24, the rod 72 and carriage 70 are drawn inward within the sleeve 52 to return the prongs 54 to the neutral position. The sleeve 52 also moves outward from the cylinder 50 to return to the position shown in FIG. 1, for example, for receiving another cushion and trim for another seat.

The automated movement of the prongs between the neutral position, the closed position and the released position facilitates an assembly process where the trim 40 can be secured to the cushion 30 using a trim flap and clip arrangement as included in the illustrated example. Having the prongs in a neutral position allows for readily placing the trim within the grip of the grippers 26. Subsequently moving the prongs 54 into the closed position secures the trim in the grip of the grippers to facilitate a reliable manipulation of the trim so that the trim flap is appropriately received and grasped by the clips 36. Automatically moving the prongs into the released position facilitates proceeding to a subsequent step of seat assembly. Accordingly, the disclosed example facilitates an automated process of securing the piece of trim 40 to the seat cushion 30.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:
1. A seat assembly machine comprising:
   a plurality of grippers situated relative to each other in a predetermined pattern that is configured to facilitate applying a piece of seat trim to a seat cushion, each gripper including two prongs retractably retained within a sleeve for gripping a portion of the piece of seat trim; and
   a control associated with the grippers for manipulating a position of the prongs between a closed position where the prongs are prevented from movement relative to each other by the sleeve, a released position where the prongs are separated from each other, and a neutral position where the prongs are biased toward each other and allowed to move relative to each other if the bias is overcome.

2. The seat assembly machine of claim 1, wherein the plurality of grippers are arranged to maintain a seat cushion in a desired position when the plurality of grippers are at least partially received in a corresponding plurality of holes in the seat cushion.

3. The seat assembly machine of claim 1, comprising at least one spring that biases at least one end of the prongs toward one another when the prongs are in the neutral position.

4. The seat assembly machine of claim 1, wherein the sleeve comprises a channel having a contour that controls whether the prongs are in the neutral, closed or released position based on a location of the prongs relative to the sleeve.

5. The seat assembly machine of claim 1, wherein
   one end of the prongs is a first distance from an end of the sleeve when the prongs are in the neutral position;

the one end of the prongs is a second, smaller distance from the end of the sleeve when the prongs are in the closed position; and the one end of the prongs is a third distance from the end of the sleeve when the prongs are in the released position, the third distance is greater than the first distance.

6. The seat assembly machine of claim 1, wherein the prongs are resiliently biased toward one another.

7. The seat assembly machine of claim 1, wherein at least one prong includes a chamfered surface facing another prong to allow insertion of an edge of trim between the prongs.

8. The seat assembly machine of claim 7, wherein the chamfered surface allows insertion of the edge of trim when the prongs are in the neutral position.

9. A seat assembly machine comprising:
a plurality of grippers situated relative to each other in a predetermined pattern that is configured to facilitate applying a piece of seat trim to a seat cushion, each gripper including two prongs retractably retained within a sleeve for gripping a portion of the piece of seat trim;
a control associated with the gripper for manipulating a position of the prongs between a closed position where the prongs are prevented from movement relative to each other by the sleeve, a released position where the prongs are separated from each other, and a neutral position where the prongs are biased toward each other and allowed to move relative to each other if the bias is overcome; and
at least one spring that biases at least one end of the prongs toward one another when the prongs are in the neutral position.

10. The seat assembly machine of claim 1, wherein each of the closed position, released position, and neutral position corresponds to a different axial position of the prongs relative to the sleeve.

11. The seat assembly machine of claim 1, wherein the grippers are arranged on a work surface.

12. The seat assembly machine of claim 11, wherein
each sleeve is telescopically, at least partially received in a cylinder, and
each cylinder is in a fixed position relative to the work surface.

13. The seat assembly machine of claim 12, wherein the cylinders are situated relative to the work surface to be at least partially received through an opening in a seat cushion for positioning the seat cushion relative to the work surface.

14. The seat assembly machine of claim 1, wherein each gripper comprises a pivot member positioned between the two prongs.

15. The seat assembly machine of claim 14, wherein each gripper comprises a carriage and a rod fixed to the carriage, wherein the two prongs and the pivot member are associated with the carriage such that movement of the rod relative to the sleeve causes corresponding movement of the two prongs and the carriage within the sleeve.

16. The seat assembly machine of claim 1, wherein the prongs are operative to grip the piece of trim in the neutral and closed positions.

17. A seat assembly machine comprising:
a gripper that has two prongs retractably retained within a sleeve for gripping a piece of seat trim; and
a control associated with the gripper for manipulating a position of the prongs between a closed position where the prongs are prevented from movement relative to each other by the sleeve, a released position where the prongs are separated from each other, and a neutral position where the prongs are biased toward each other and allowed to move relative to each other if the bias is overcome,
wherein the sleeve comprises a channel having a contour that controls whether the prongs are in the neutral, closed or released position based on a location of the prongs relative to the sleeve
wherein the contour comprises
a tapering portion near an open end of the sleeve having a first interior dimension near the open end;
a transition near an end of the tapering portion within the sleeve having a second, smaller interior dimension; and
another portion further inward into the sleeve having a third interior dimension that is larger than the second interior dimension.

18. The seat assembly machine of claim 17, wherein the transition abuts lateral edges of the prongs to prevent relative movement between the prongs when the prongs are in the closed position.

19. The seat assembly machine of claim 17, wherein the tapering portion controls a distance between the prongs when the prongs are in the released position.

* * * * *